INVENTORS
EDWARD L. GLASER
ALAN B. GERLACH
BY
Christie, Parker & Hale
ATTORNEYS.

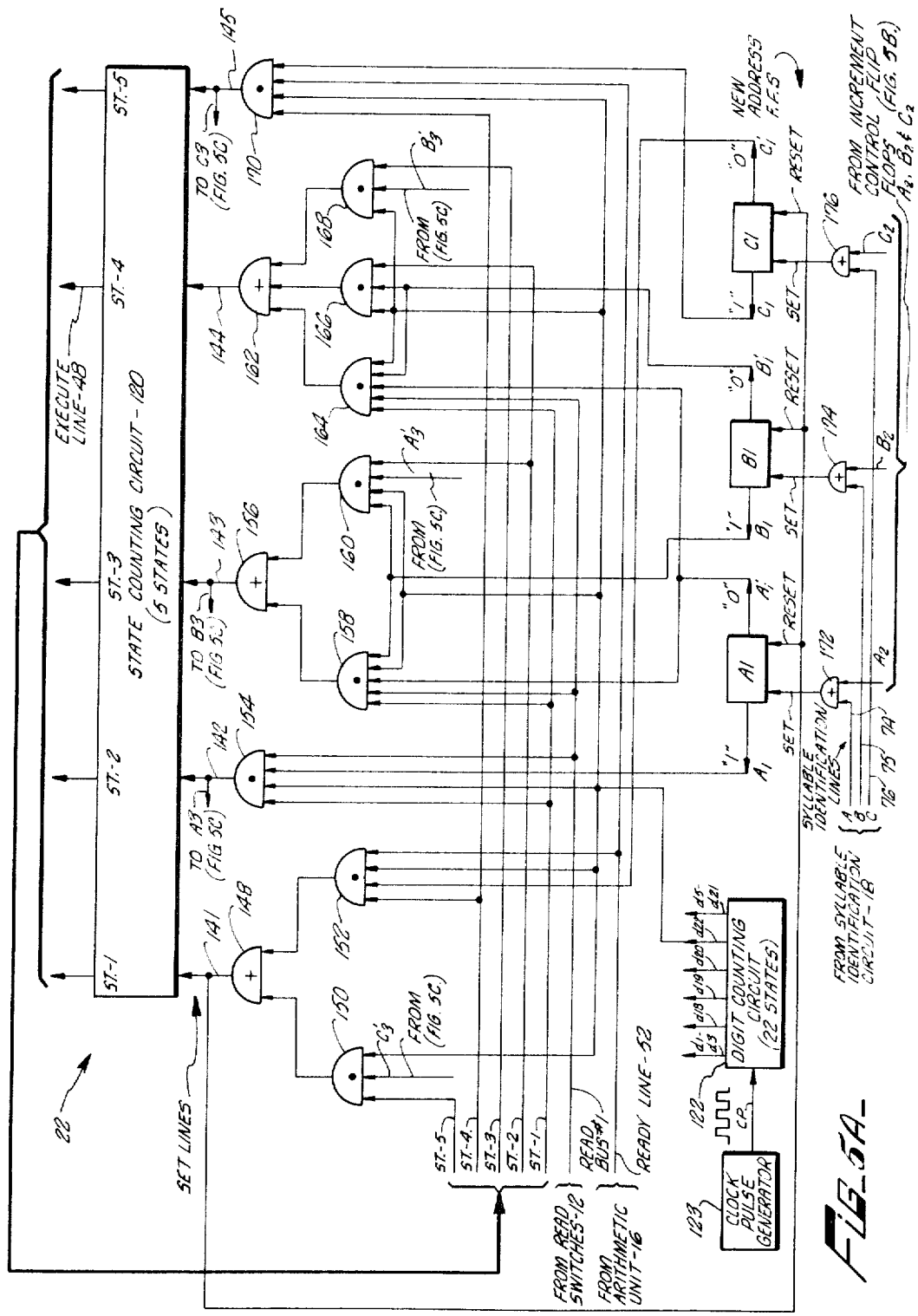

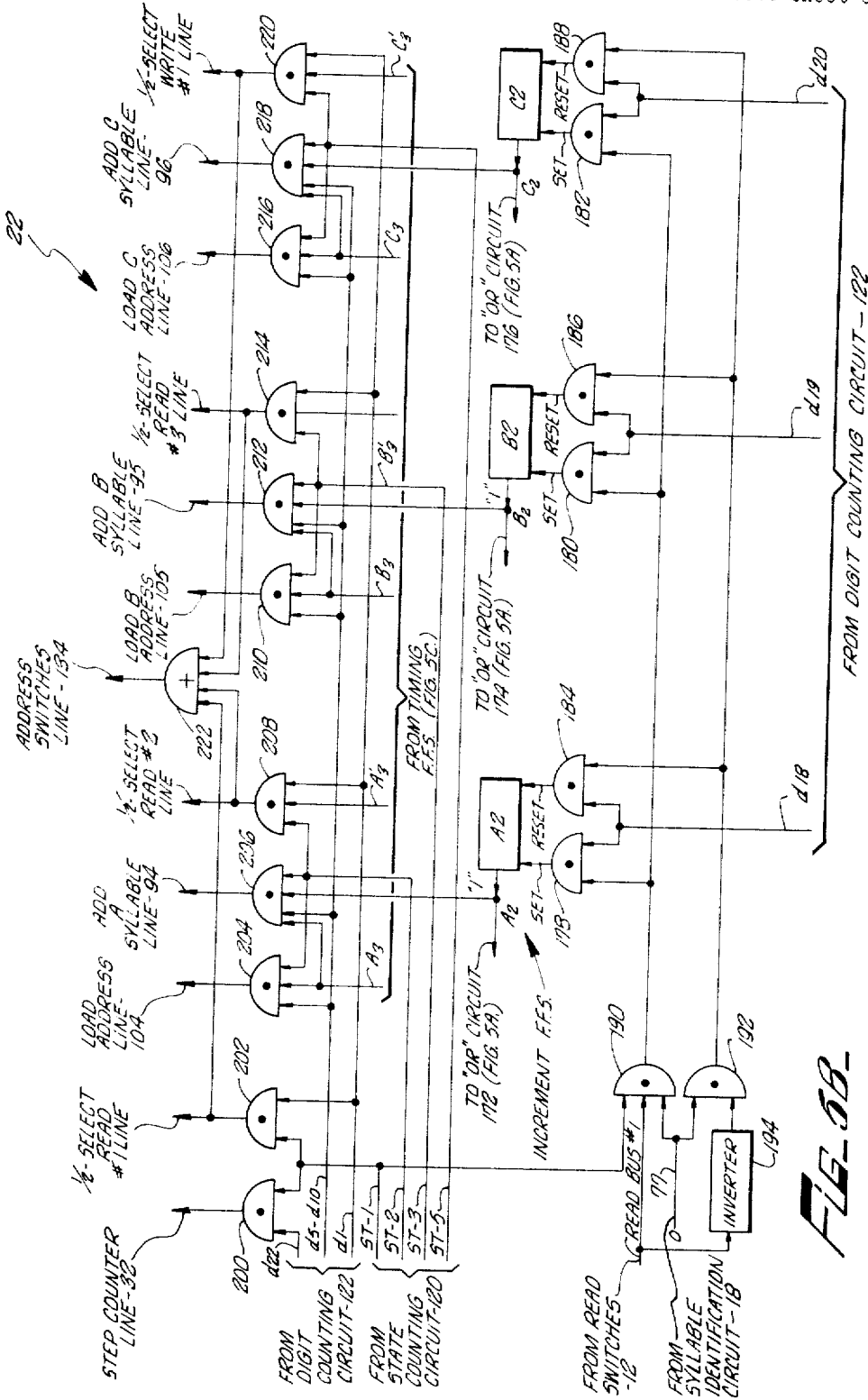

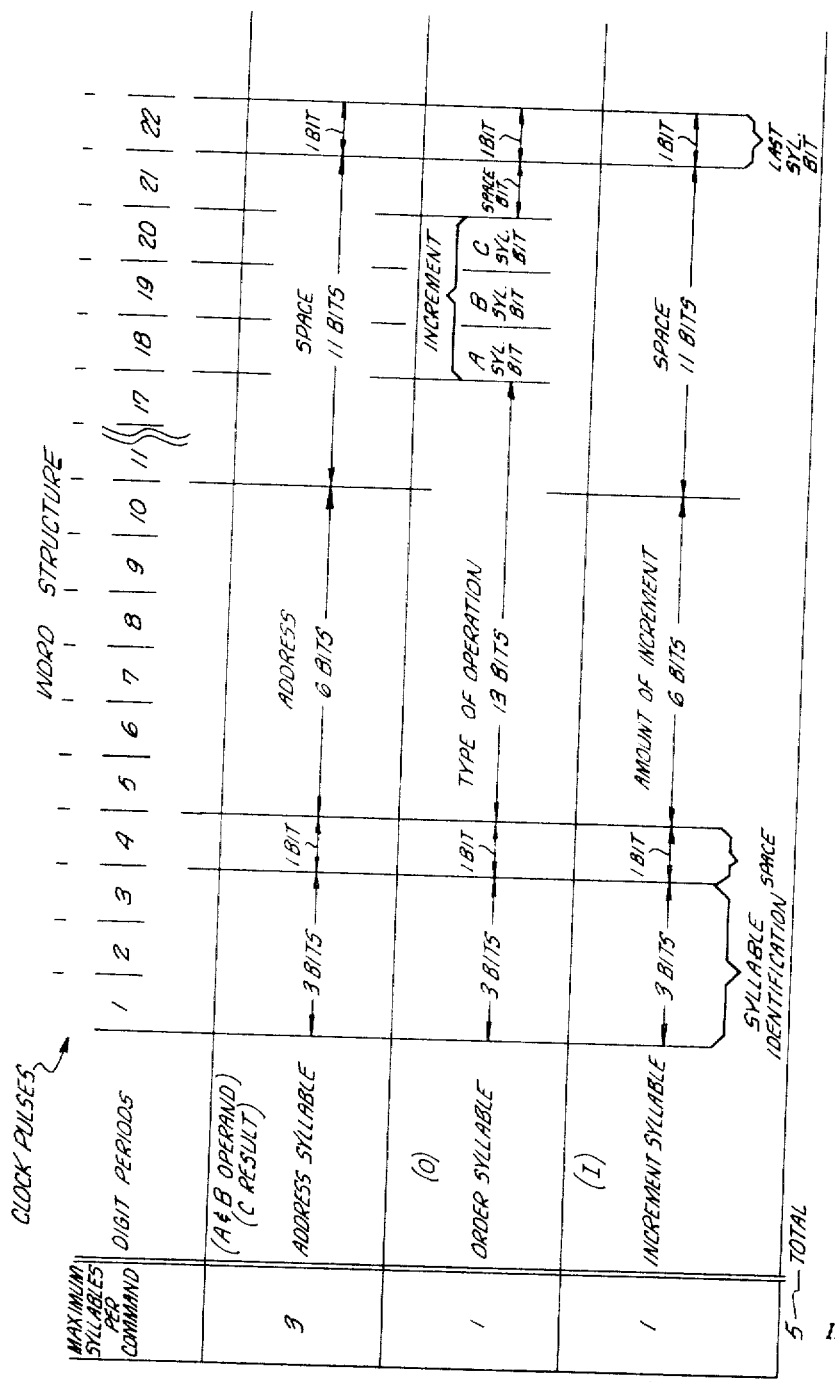

United States Patent Office

3,275,989
Patented Sept. 27, 1966

3,275,989
CONTROL FOR DIGITAL COMPUTERS
Edward L. Glaser, Newtown Square, Pa., and Alan B. Gerlach, Covina, Calif., assignors to Burroughs Corporation, Detroit, Mich., a corporation of Michigan
Filed Oct. 2, 1961, Ser. No. 142,095
19 Claims. (Cl. 340—172.5)

This invention relates to digital computer systems and more specifically to a programming system for electronic digital computers.

Generally, digital computer systems have a program consisting of a sequence of complete commands stored in a memory unit. The commands are shifted out of the memory unit to various operational units in sequence for controlling the operation of the computer system.

A fixed length command word is usually used. Therefore, in a three-address computer, each command always has three addresses and an order. If any one of the addresses or the order is absent, the computer system will not operate correctly.

Computer systems have been arranged wherein one of the addresses of a command may be incremented and used as part of a subsequent command. The disadvantage of this arrangement is that the amount by which the address is to be incremented must be determined by a separate computer command.

In contrast, the present invention utilizes programming by exception. In a preferred embodiment of the present invention, utilizing programming by exception, each command only contains that portion which is changed or different from the previous command. If this concept were extended to its absolute end, one would only change those individual signal bits of a command which are different from those of the previous command. Normally, this is not practical, therefore, a complete command is broken down into parts or syllables. Each syllable has a fixed length or a fixed number of signal bits. A programmer need only put those syllables in a command which are different from the previous command. When a syllable is missing from a command, the subsequent steps depend on the type of syllable missing.

Briefly, a specific embodiment of the present invention has a memory unit for storing a sequence of commands and operands. There are five possible syllables in each command; two operand address syllables, a result address syllable, an order syllable and an increment syllable. The commands are serially shifted out of the memory unit in sequence and stored in a command register. Each command may have a maximum of three address syllables or all address syllables may be absent. Also, each command may or may not have an order syllable or an increment syllable. Each command must have at least one syllable.

Each syllable is self identifying. A syllable identification circuit is connected to the memory unit to identify each syllable as it is shifted out of the memory unit and cause the command register unit to store the syllable in the correct location. Therefore, the syllables may be shifted out in any sequence. The command register unit permanently stores each syllable of a command until a new syllable is shifted out of the memory unit to replace that particular command syllable.

An arithmetic unit is provided. Once a new command has been shifted into the command register unit, the memory unit automatically shifts out the operands specified by the new operand address syllables. The shifted out operands are stored in the arithmetic unit which subsequently executes operations on the operands as specified by the order syllable. When the execution is complete, the arithmetic unit shifts out the result. The result is stored in the memory location of the memory unit specified by the result address syllable in the command register.

In the absence of one or more of the address syllables from a command, the operation changes. When an operand address syllable is absent the old operand, still stored in the arithmetic unit, will be used as an operand. If the result address syllable is absent, the result of the arithmetic operation will not be stored in the memory unit. If a command does not have an order syllable, the arithmetic unit will perform the operation specified by the old order syllable still stored in the command register.

The increment syllable specifies the amount by which address syllables are to be automatically incremented. The order syllable determines when and which of the address syllables are to be incremented. The increment syllable may be carried in any command without necessitating a special command. Also, it may be left out of any command in which it is not needed.

In contrast to previous stored program systems, computer systems incorporating the present invention minimize program storage by reducing all redundancies. Also, the time required to fetch commands from memory is minimized. In addition, the present invention makes programming by exception available to the programmer who may or may not use it at his discretion.

A better understanding of the present invention may be obtained with reference to the following discussion of the figures of which:

Figure 1:
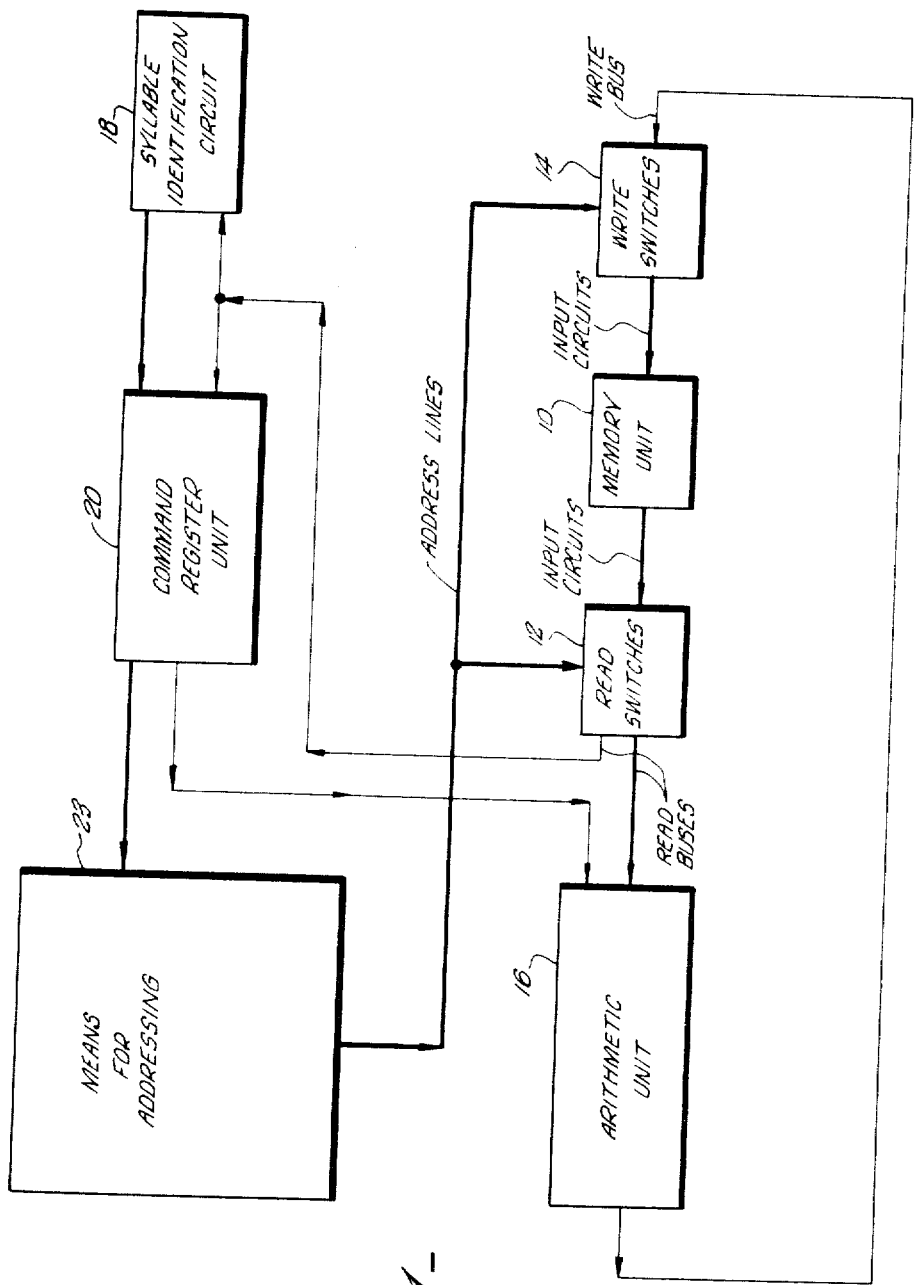
FIGURE 1 is a general schematic representation of a programmable computer system embodying the present invention.
Figure 2:
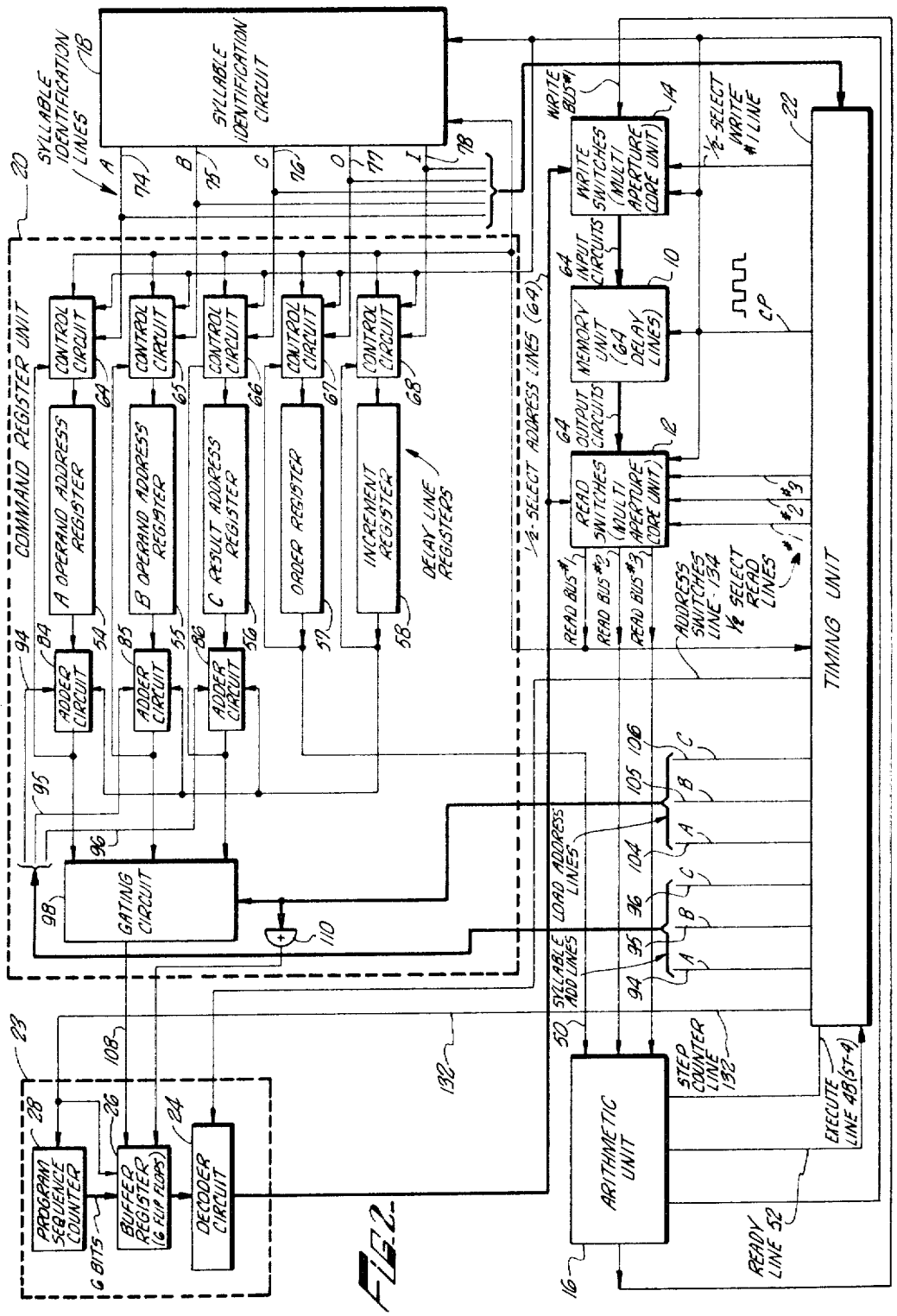
FIGURE 2 is a more detailed schematic representation of the programmable computer system of FIG. 1.
Figure 5B:
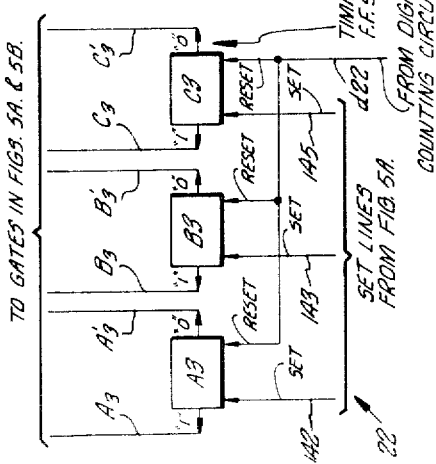
Figure 6:
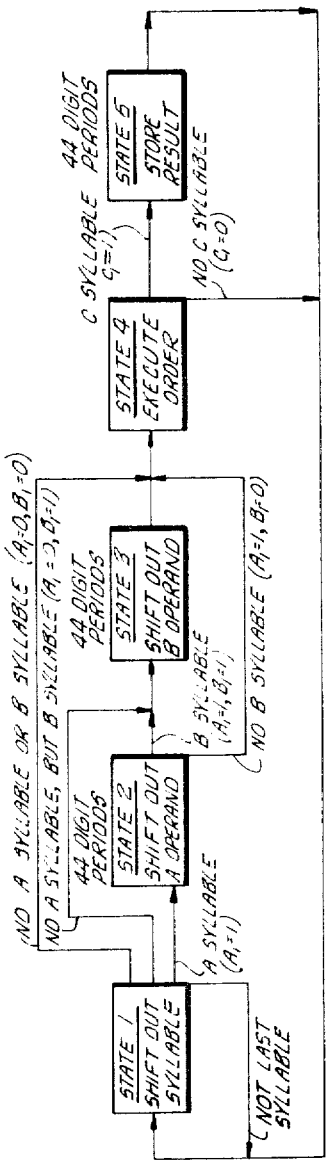

FIGURES 5-A, 5-B and 5-C are schematic representations of a timing unit for use in FIGS. 1 and 2;

FIGURE 6 is a flow diagram illustrating the sequence of operation of the computer system of FIGS. 1 and 2; and FIGURE 7 is a diagram illustrating the word structure of signals used in the programmable computer system of FIGS. 1 and 2.

GENERAL DESCRIPTION

A general description of the circuits and operation of the computer system shown in FIG. 1 will now be given. Throughout the drawings a heavy connecting line indicates a cable or group of electrical conductors, whereas a thin line indicates a single electrical conductor.

A memeroy unit 10, read switches 12 and write switches 14 are provided. The read and write switches 12 and 14 are connected to output and input circuits, respectively, of the memory unit 10 for reading signals out of and writing signals into the memory.

An arithmetic unit 16, a syllable identification circuit 18 and a command register unit 20 are also provided with input circuits connected to the read switches 12. The arithmetic unit 16 also has an output circuit connected to the write switches 14. A means for addressing 23 is provided with input and output circuits connected to the command register unit and read and write switches 12 and 14, respectively.

Refer to FIG. 7 wherein it is indicated that the possible number of syllables in a command includes "A" and "B" operand address syllables, a "C" result address syllable, an "O" order syllable and an "I" increment syllable, hereinafter referred to as the A, B, C, O and I syllables. The commands are stored in the memory unit 10 in a prearranged sequence to define a program of operation for the computer system.

With the general circuit arrangement of the computer system of FIG. 1 in mind, a brief description of its operation will now be given, with reference to the computer flow diagram of FIG. 6. Initially the computer system is in state one and the means for addressing 23 automatically provides program address signals to the read switches 12. The program address signals specify the memory location in the memory unit 10, where the first syllable of the first command is stored. The read switches 12 cause the first syllable followed by the rest of the syllables in the first command to be shifted out of the memory 10 in the sequence in which they are stored. Each syllable has signals for identification. The syllable identification circuit 18 detects the identification signals of each syllable as it is shifted out and provides a signal to the command register 20, causing the syllable to be stored in the correct one of a number of storage registers therein.

Assume that the first command has A, B, O and C-syllables and that they are now stored in the command register 20. The computer system now steps into state two and the A-syllable is shifted out of the command register 20 and stored in the means for addressing 23. The means for addressing 23 decodes the A-syllable therein and provides decoded address signals to the read switches 12. This causes the corresponding memory location in the memory unit 10 to be addressed and the first operand called the "A" operand is shifted out and stored in the arithmetic unit 16. This sequence of operation is repeated again during state three but using the B-syllable causing a "B" operand to be stored in the arithmetic unit 16.

The computer system now steps into state four and the arithmetic unit 16 executes the order specified by the O-syllable stored in the command register 20.

When the arithmetic unit 16 completes the execution of the order, the computer system steps into state five and the C-syllable is shifted out of the command register 20 and stored in the means for addressing 23. The means for addressing 23 decodes the C-syllable and addresses the memory unit 10 through the write switches 14. The result of the arithmetic operation is then shifted out of the arithmetic unit 16 through the write switches 14 and stored in the addressed memory location.

Consider the operation when one or more of the syllables of the first command are missing. First, assume that the first command stored in the command register 20 is the same except that the A-syllable is missing. The computer system skips from state one to state three and the B-syllable is shifted out to the means for addressing 23, the same as described above, causing the new B operand to be shifted out and stored in the arithmetic unit 16. The A-syllable is absent from the command, however, the old A operand used during the execution of the previous command is still stored in the arithmetic unit 16 even though execution of the previous order is complete. The computer system now enters state four and the arithmetic unit 16 executes the order specified by the O-syllable using the new B operand, and the old A operand. During state five the result is stored in the memory 10.

Now assume both of the A and B-syllables are absent but the O and C-syllables are present in the first command stored in the command register 20. In this situation, the computer system skips from state one to state four and the arithmetic unit 16 executes the order specified by the O-syllable stored in the command register 20 but using both the old A and B operands used during the previous command, which are still stored in the arithmetic unit 16. During state five the result is stored.

Assume that the C-syllables is absent from the first command and the A, B, and O-syllables are present. In this case, the sequence of operation is the same as that where all syllables of the first command are present except the computer system skips from state four to state one and the result of the arithmetic operation is not stored in the memory unit 10.

If the O-syllable is the only syllable absent from the first command the execution by the arithmetic unit 16 is performed using the old O-syllable as if none of the syllables were absent. To be explained in the detailed description the I-syllable is used to increment the A, B, and C-syllables.

DETAILED DESCRIPTION

Word structure

With the general description and operation of the computer system of FIG. 1 in mind, a detailed description will be given of the A, B, C, O and I-syllables with reference to the word structure diagram of FIG. 7.

All of the syllables are similar in that in each there are twenty-two binary coded digital bits; the first three bits identify the type of syllable it is, the fourth bit is a space bit and bit twenty-two (the last bit) indicates whether that syllable is the last syllable in a command. Bit twenty-two is important since all commands have one or more syllables arranged in a random sequence. When the program, consisting of a sequence of commands is written, the last syllable of each command must be identified in order to distinguish the end of one command from the beginning of the next. This is done using bit twenty-two of each syllable.

In the address syllables, including the A, B, and C-syllables, the bits five through ten are coded to represent addresses of locations in the memory 10, and bits eleven through twenty-one are space bits. In the O-syllable, bits five through seventeen specify the order or type of operation the arithmetic unit 16 is to perform. Bits eighteen, nineteen and twenty of the O-syllable specify whether the amount represented by the I-syllable is to be added to the A, B, and C-syllables, respectively. Bit twenty-one of the O-syllable, is a space bit. In the I-syllable, bits five through ten specify the amount to be added to bits five through ten of the A, B, and C-syllables. Bits eleven through twenty-one of the I-syllable are space bits.

To be explained, the bits of each syllable shown in FIG. 7 are shifted out in series beginning from the left and progressing to the right. Thus, the lowest numbered bit is shifted out first and the highest numbered bit is shifted out last. Also, to be further explained, the syllable bits are shifted out of the memory 10 in synchronism to clock pulses, as indicated at the top of FIG. 7.

Memory

Referring now to FIG. 2, the memory unit 10 by way of example has 64 addressable memory locations each for storing twenty-two binary coded digital signals. Each memory location is a magnetostrictive delay line in which signals are stored in acoustic delay lines by continually recirculating them in synchronism to clock pulses from an output transducer, connected to one end of the acoustic delay line, back to an input transducer. The recirculating delay line system is provided with conventional switching circuits such as flip-flop circuits for reading, writing and erasing signals in the acoustic delay lines. The clock pulses are provided to the memory unit 10 by an output circuit CP of a timing unit 22.

The read and write switches 12 and 14 couple the input and output circuits respectively, of the memory unit 10 to lines called read and write buses, connected to other circuits in the computer system. Three read lines or buses, designated read bus #1, read bus #2 and read bus #3 are connected to the output of the read switches 12. The read switches 12 also have three control lines designated ½-select read line #1, ½-select read line #2 and ½-select read line #3. Sixty-four ½-select address lines are connected to the read switches 12. A ½ select current signal on one of the ½-select read lines in coincidence with a ½ select current signal on one of the sixty-four address lines establishes a connection between the output circuit of one of the sixty-four delay lines in the memory 10 and one of the read buses. The ½ select signal on the ½-select read lines #1, #2 and #3 establishes the connection to the read buses #1, #2 and #3 respectively. The ½ select signal on one of the sixty-four ½-select address lines establishes which of the sixty-four memory locations or delay lines the read bus is to be connected to.

The write switches 14 are similar to the read switches 12. The write switches 14 are also connected to the sixty-four ½-select address lines and to a ½-select write line #1. The coincident ½ select signals on these lines establish a connection between a write bus #1, and one of the memory locations or delay lines in the memory 10.

Once a connection is established through the read switches 12, the twenty-two signal bits stored in the addressed memory location are shifted out in series as high and low potential digital signals and then the connection is broken by internal timing circuits (not shown). Similarly, once a connection is established through the write switches 14, the connection remains established long enough to serially shift in and store twenty-two signal bits applied to the write bus #1, then the connection is broken.

The read and write switches 12 and 14 are multi-aperture core units. Details of such a system as described above, including the read and write switches 12 and 14 and the memory unit 10 are shown and described in Patent No. 3,007,140 by R. C. Minnick et al. Storage Apparatus, and assigned to the same assignee as the present application.

Although, by way of example, each delay line of memory 10 has been described having only twenty-two signal bits of storage, it should be understood that more storage may be provided by providing the appropriate identification or addressing circuits. It should also be understood that other types of read and write switches than the multi-aperture core type may be used; for example, diode gating circuits or transistor switching circuits. Also, the memory circuit 10 may be other types of memory devices, for example, a magnetic drum memory or a magnetic core memory. It should also be understood that the read and write switches 12 and 14 could be an integral part of a memory system.

*Arithmetic unit*

Figure 3:
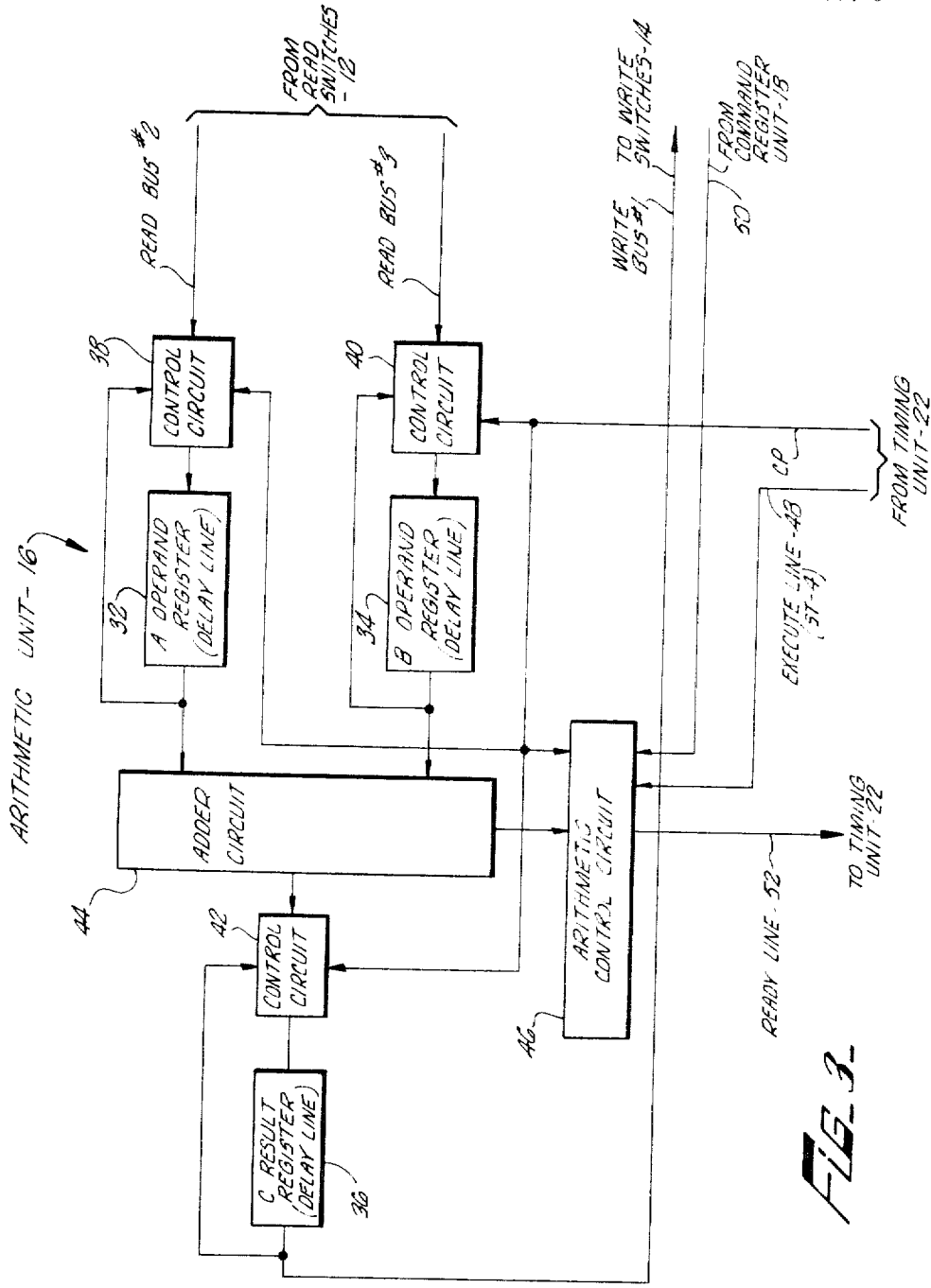
FIGURE 3 is a schematic representation of an arithmetic unit for use in FIGS. 1 and 2.

Refer now to the arithmetic unit 16 shown in detail in FIG. 3. The arithmetic unit 16 has A and B operand registers 32 and 34 for storing the twenty-two signal bits of the A and B operands shifted out from the memory 10. Also provided is a C register 36 for storing the result of an arithmetic computation on the operands. The registers 32, 34 and 36 have control circuits 38, 40 and 42, respectively, connected between their input and output circuits. The registers 32, 34 and 36 are magnetostrictive delay line memory circuits similar to those in the memory 10. The registers 32, 34 and 36, in conjunction with the respective control circuits 38, 40 and 42 are recirculating registers. The control circuits 38 and 40 have their input circuits connected to the read buses #2 and #3. The clock pulses from the timing unit 22 synchronize the operation of each of the control circuits and delay lines.

Normally the control circuits 38 and 40 couple the output circuits of the A and B operand registers to their input circuits. However, the control circuits have gating and timing circuits (not shown) which are responsive to signals on the read buses #2 and #3 and timing from the timing unit 22 to disconnect the output circuits of the operand registers from their input circuits and couple any signals applied to the respective read buses to the input circuits of the operand registers. Thus, signals are stored in the delay lines and are permanently stored and recirculated therein. Whenever new operand signals are applied on the read buses #2 and #3, the operand signals are automatically read and stored in the A and B operand registers 32 and 34.

The operation of the C result register 36 and the control circuit 42 is identical to that of the operand registers 38 and 40 and their control circuits. Other details of a similar storage system are disclosed in the above reference patent entitled Storage Apparatus.

The output circuits of the A and B operand registers 32 and 34 are connected to an adder circuit 44. The adder circuit 44 operates under the control of timing from an arithmetic control circuit 46. The adder circuit 44 executes the order specified by the O-syllable stored in the command register 20, under the control of the arithmetic control circuit 46.

The arithmetic control circuit 46 has an input circuit connected to the timing unit 22 by means of an execute line 48. The arithmetic control circuit 46 is also connected to a line 50, which is also connected to the command register 20. To be explained, the O-syllable signals are continuously and serially applied to the line 50. The arithmetic control circuit 46 has conventional timing and gating circuits for causing the execution of the order stored in the command register 20. The arithmetic and control circuit 46 is responsive to a high potential signal on the execute line 48 to start the arithmetic operations. The arithmetic and control circuit 46 also has an output circuit connected to a ready line 52. When an arithmetic operation has been executed, and the result is stored in the C result register 36, the circuit 46 develops a high potential ready signal on the line 52 during twenty-two consecutive clock pulses. This signal is applied to the timing unit 22.

*Command register*

Refer now to the command register 20, shown in FIG. 2. The command register 20 has five separate registers called the A operand address register 54, the B operand address register 55, the C result address register 56, the order register 57 and the increment register 58. The register circuits 54 through 58 have their input and output circuits connected to control circuits 64 through 68, respectively. The register circuits 54 through 58 are magnetostrictive delay lines similar to the registers in the arithmetic unit 16. The control circuits 64 through 68 have input control circuits connected to syllable identification lines 74 through 78, respectively. Also, the control circuits have their input circuits for receiving new signals connected to the read bus #1. All the control circuits 64 through 68 are synchronized to the clock pulses developed at the CP output circuit of the timing unit 22. The control circuits 64 through 68 are slightly different from the control circuits of the arithmetic unit in that they have gating circuits which normally couple the output circuits back to their input circuits whenever the potential on the lines 74 through 78 are all at a low potential. Whenever a high potential signal is applied to their respective syllable identification lines 74 through 78 during a clock pulse, the read bus #1 is coupled to the input circuit of the register circuits.

The output circuit of the order register 57 is connected to the line 50. The line 50 is the one connected to the input circuit of the arithmetic control circuit 46, of the arithmetic unit 16.

The A, B and C address registers 54, 55 and 56 are also slightly different from the registers in the arithmetic unit 16 in that they have their output circuits connected to adder circuits 84, 85 and 86, respectively, rather than directly to the control circuits. The output circuits of the adder circuits 84, 85 and 86 are then the circuits connected back to the control circuits 64 through 66. Each of the adder circuits 84, 85 and 86 also have an input circuit connected in series to the output circuit of the increment register 58. The adder circuits 84, 85 and 86 also have input control circuits connected to A, B and C-syllable add lines 94, 95 and 96, respectively, from the timing unit 22. The add circuits have logical gating circuits (not shown) that are responsive to a low potential signal on their respective add lines for normally coupling the output circuits of the address register circuits back to their respective control circuits thereby normally allowing recirculation of signals in the registers. However, the adder circuits are responsive to each high potential signal on their respective add lines for algebraically adding the bits represented by binary coded output signal of the increment register 58 to that out of the register circuits. Binary coded signals corresponding to this summation are developed at the output circuits of the adder circuits and applied back to their respective control circuits.

The output circuits of the adder circuits 84, 85 and 86 are also connected to input circuits of a gating circuit 98. The gating circuit 98 has three input control circuits connected to load A, B and C address lines 104, 105 and 106. The gating circuit 98 also has an output circuit connected to the line 108. The line 108 is connected in serial circuit relation to an input circuit of a buffer register 26 of the means for addressing 23. A high potential signal on the load A address line 104 causes the gating circuit 98 to couple the output circuit of the adder circuit 84 to the line 108. Similarly, a high potential signal on the load address lines 105 and 106 causes the output circuits of the adder circuits 85 and 86, respectively, to be connected to the line 108.

The load A, B and C address lines 104, 105 and 106 are also connected to input circuits or an "or" gating circuit 110. A high potential signal applied to any one or more of the lines 104 through 106 causes the gating circuit 110 to develop a high potential output signal. The output circuit of the "or" gating circuit 110 is connected to an input circuit of the buffer register 26 in the means for addressing 23.

Syllable identification circuit

Before describing the syllable identification circuit 18, reference will now be made to two counting circuits in the timing unit 22. FIG. 5-A shows a portion of the timing unit 22 including a state counting circuit 120 and a digit counting circuit 122. These circuits will be discussed in detail in the section describing the timing unit. However, it should be noted at this point that the state counting circuit 120 has five output circuits represented by the symbols ST-1 through ST-5. Also, the digit counting circuit 122 has six output circuits represented by the symbols $d1-d3$, $d18$, $d19$, $d20$, $d22$ and $d5-21$. These output circuits are connected to various circuits hereinafter discussed.

Figure 4:
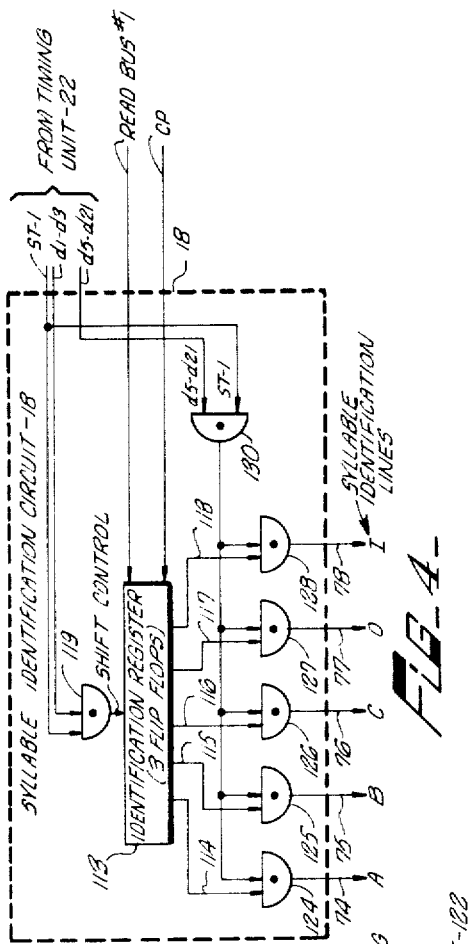
FIGURE 4 is a schematic representation of a syllable identification circuit for use in FIGS. 1 and 2.

Refer now to the syllable identification circuit 18 and the details thereof shown in FIG. 4. The syllable identification circuit 18 has an identification register 113. The identification register 113 has three flip-flop circuits for serially shifting in and storing the first three signal bits, or identification bits, of each syllable as they are serially shifted out on the read bus #1. The identification register 113 has a control circuit connected to an "and" gating circuit 119 and has gating circuits (not shown) responsive to high potential signals from the "and" gating circuit 119 to serially shift in and store digital signals developed on the read bus #1 in synchronism to clock pulses.

The "and" gating circuit 119 has one input circuit connected to the ST-1 and another input circuit connected to the $d1-d3$ output circuits of the timing unit 22. To be explained only, the identification bits of each syllable shifted out of the memory unit 10 will be stored in the register circuit 113.

The register circuit 113 also has gating circuits (not shown) connected to the output lines 114 through 118. Only one of the output lines 114 through 118 will have a high potential signal thereon at one time. When the output line 114 has a high potential signal thereon the three binary bits stored in the register circuit 113 indicate an A-syllable is being shifted out of the memory 10.

Similarly, whenever a high potential signal is developed on the output lines 115 through 118, the three signal bits stored in the register circuit 113 indicate B, C, O and I-syllables, respectively, are being shifted out of the memory 10. The lines 114 through 118 are connected to input circuits of "and" gating circuits 124 through 128, respectively. The "and" gating circuits 124 through 128 have another input circuit connected to the output circuit of an "and" gating circuit 130. The "and" gating circuit 130 has one input circuit connected to the ST-1 output circuit and another input circuit connected to the $d5-d21$ output circuit of the timing unit 22. The output circuits of the "and" gating circuits 124 through 128 are connected to the syllable identification lines 74 through 78, respectively.

Means for addressing

Refer now to the details of the means for addressing 23 shown in FIG. 2. A program sequence counter 28 is provided which sequentially steps from one state of operation to the next in response to each high potential pulse applied on a step counter line 132. The program sequence counter 28 is a ring type counter which sequentially steps through a plurality of states of operation depending on the number of program steps, and then recycles back to its initial state for repeating the sequence of operation. Gating circuits (not shown) are provided for developing a six bit binary coded output signal in parallel, corresponding to each state of operation of the counter 28.

The input circuit of the buffer register 26 is connected in parallel to the output circuit of the program sequence counter 28. The buffer register 26 has six flip-flop circuits (not shown) for storing signals corresponding to the six bit binary coded output signal of the program sequence counter 28. The buffer register 26 also has gating circuits (not shown) connected to the step counter line 132 and is responsive to a high potential signal applied thereto for reading the output signals of the program sequence counter 28 in parallel and for storing signals corresponding thereto in the flip-flop circuits contained therein. Gating circuits in the buffer register 26 are also connected to the "or" gating circuit 110 and are responsive to each high potential signal developed thereby for serially shifting in and storing a digital signal applied to the line 108 by the gating circuit 98.

A decoder circuit 24 in the means for addressing 23 is connected to the output circuit of the buffer register 26. The decoder circuit 24 also has an input circuit connected to an address switches line 134. The output circuit of the decoder circuit 24 is connected to the sixty-four ½-select address lines which are connected to input circuits of the read and write switches 12 and 14. Whenever a high potential signal is developed on the address switches line 134, the decoder circuit 24 reads the signals stored in the buffer register 26 in parallel and developes a ½ select current signal on one of its sixty-four address lines corresponding to the signals stored in the buffer register 26. The magnitude of the ½ select current signal out of the decoder circuit 24 is exactly half that required to magnetically saturate one of the core units in the read and write switches 12 and 14 and establish a connection to one of the delay lines in the memory 10. Thus, a ½ select signal on one of the sixty-four address lines in coincidence with a ½ select signal on one of the ½-select read lines is of sufficient magnitude to cause a connection to be established to the output of a delay line in memory 10.

A decoding circuit, using gating circuits and core units similar to the decoding circuit 24 described above, is shown and described in a copending application assigned to the same assignee as this application, bearing Serial No. 13,194, now Patent No. 3,141,158, and filed on March 7, 1960.

Timing unit

With the other circuits of FIG. 2 in mind, a detailed description will now be given of the timing unit 22, with reference to the schematic diagram thereof shown in FIGS. 5–A, 5–B and 5–C. The timing unit 22 develops timing pulses on the various output lines shown in FIG. 2 for sequencing the operation of the computer system.

Nine flip-flop circuits are referred to in the discussion of the timing unit 22. These flip-flop circuits are called the new address flip-flops A1, B1 and C1 (see FIG. 5–A), the increment flip-flops A2, B2 and C2 (see FIG. 5–B) and the timing flip-flops A3, B3 and C3 (see FIG. 5–C). The new address flip-flops A1, B1 and C1 indicate when new address syllables A, B, and C have been shifted out of the memory 10. The increment flip-flops A2, B2 and C2 indicate when the O-syllable specifies that the A, B and C-syllables, respectively, are to be incremented. The timing flip-flops A3, B3 and C3 are for timing purposes hereinafter described in detail.

Each of the flip-flop circuits has two output circuits, two input circuits and two states of operation. The states are referred to as the "1" and "0" states. The output circuits of the flip-flops are designated by the same letter symbol as the corresponding flip-flop followed by the same number as the flip-flop, but which is shown as a subscript. The output circuit which has a high potential signal thereon when the flip-flop is in a "1" state is unprimed, i.e., $A_1$, $B_2$, etc. The output circuit which has a high potential signal applied thereto when the flip-flop is in a "0" state has a prime affixed thereto, i.e., $A_1'$, $B_2'$, etc.

Refer now to FIG. 5–A. The state counting circuit 120 is shown with its associated input gating circuits, for sequencing its operation. The state counting circuit 120 is triggered into one of five possible states in response to high potential input pulses on the set lines 141 through 145 connected to its input circuit. An input pulse on the set line 141 triggers the state counting circuit 120 into state one. Similarly, a pulse on the set lines 142 through 145 triggers the state counting circuit 120 into the states two through five, respectively.

The output circuits corresponding to the states are represented by the symbols ST–1, through ST–5. Whenever the state counting circuit 120 is in a particular state, the corresponding output circuit is at a high potential level. The state of the state counting circuit 120 will hereinafter be referred to as the state of the computer system as represented in the flow diagram of FIG. 6.

The digit counting circuit 122 has twenty-two states. The digit counting circuit 122 has its counting input circuit connected to the CP output circuit of a clock pulse generator 123. The digit counting circuit 122 is responsive to the rectangular reoccurring clock pulses from the clock pulse generator 123 to sequentially count through states one through twenty-two and then recycle back to state one.

In the following discussion, the states of the digit counting circuits 122 will be referred to as digit periods. The digit counting circuit 122 has six output circuits designated $d1$–$d3$, $d18$, $d19$, $d20$, $d22$ and $d5$–$d21$. The number behind the small letter "d" is used to designate the digit periods or states during which the digit counting circuit 122 develops a high potential output pulse at the particular output circuit bearing this designation. Thus, the digit counting circuit 122 has a counting circuit and gating circuits for developing a pulse at the output circuit $d1$–$3$ during each of the digit periods one through three, etc.

Refer now to the gating circuits for the state counting circuit 120. The set line 141 is connected to an output circuit of an "or" gating circuit 148. The "or" gating circuit 148 has two input circuits connected to output circuits of "and" gating circuits 150 and 152. The input circuit of the "and" gating circuit 150 is connected to the output circuits $d22$ and ST–5 of the digit counting circuit 122 and the state counting circuit 120 respectively and an output circuit $C_3'$ of the timing flip-flop C3 (see FIG. 5–C). The "and" gating circuit 152 has its input circuits connected to the $d22$ and the ST–4 output circuits, the ready line 52 and the $C_1'$ output circuit of the new address flip-flop circuit C1.

The set line 142 is connected to an output circuit of an "and" gating circuit 154. The "and" gating circuit 154 has input circuits connected to the ST–1 and the $d22$ output circuits, the read bus #1 and the $A_1$ output circuit of the new address flip-flop A1.

The set line 143 is connected to the "or" gating circuit 156. The "or" gating circuit 156 has its input circuits connected to "and" gating circuits 158 and 160. The "and" gating circuit 158 has its input circuits connected to the ST–1 and $d22$ output circuits, the read bus #1, the $A_1'$ and $B_1$ output circuits of the new address flip-flops A1 and B1. The "and" gating circuit 160 has its input circuits connected to the ST–2 and the $d22$ output circuits and the $B_1$ and $A_3'$ output circuits of the flip-flops B1 and A3.

The set line 144 is connected to an output circuit of an "or" gating circuit 162. The "or" gating circuit 162 has its input circuits connected to the output circuits of "and" gating circuits 164, 166 and 168. The gate 164 has its input circuits connected to the output circuits ST–1 and $d22$, the $A_1'$ and $B_1'$ output circuits of the new address flip-flops A1 and B1, and the read bus #1. The "and" gating circuit 166 has its input circuits connected to the $B_1'$ output circuit of the new address flip-flop B1 and the output circuits ST–2 and $d22$. The "and" gating circuit 168 has its input circuits connected to the ST–3, and $d22$, and the $B_3'$ output circuits.

The set line 145 is connected to an output circuit of an "and" gating circuit 170. The "and" gating circuit 170 has its input circuits connected to the ST–4 and $d22$ output circuits, the ready line 52 and the $C_1$ output circuit of the new address flip-flop C1.

With the input gating circuits for the state counting circuit 120 in mind, the gating circuits for the new address flip-flops will be described. The new address flip-flops A1, B1 and C1 have their input circuits for triggering them into "1" states connected to the output circuits of "or" gating circuits 172, 174, and 176, respectively. The input circuits of the new address flip-flops A1, B1, and C1 for triggering them into "0" states are all connected to the set line 141, used to trigger the state counting circuit into state one.

The "or" gating circuit 172 has its input circuits connected to the A-syllable identification line 74 (from the syllable identification circuit 18) and the $A_2$ output circuit of the increment control flip-flop circuit A2. The "or" gating circuit 174 has its input circuits connected to the B-syllable identification line 75 and the $B_2$ output of the increment control flip-flop B2. The "or" gating circuit 176 has its input circuits connected to the C-syllable identification line 76 and the $C_2$ output circuit of the increment control flip-flop C2.

With details of the portion of the timing unit 22 shown in FIG. 5–A in mind, refer to FIG. 5–B. The increment control flip-flops A2, B2, and C2 have their input circuits for triggering them into "1" states connected to output circuits of "and" gating circuits 178, 180, and 182, respectively. The input circuits of the increment control flip-flops A2, B2, and C2 for triggering them into "0" states are connected to output circuits of "and" gating circuits 184, 186, and 188.

The "and" gating circuits 178, 180, and 182 all have an input circuit connected to an "and" gating circuit 192. Also, the "and" gating circuits 184, 186, and 188 all have input circuits connected to an "and" gating circuit 192. The "and" gating circuits 178 and 184 have input circuits connected to the $d18$ output circuit. The "and" gating circuits 180 and 186 have input circuits connected to $d19$ output circuit. Similarly, the "and" gating circuits 182 and 188 have input circuits connected to the d20 output circuit.

The "and" gating circuit 190 has three input circuits which are connected to the ST-1 output circuit, the read bus #1 and the O-syllable identification line 77. The "and" gating circuit 192 has two input circuits connected to the O-syllable identification line 77 and an inverter circuit 194. The input circuit of the inverter 194 is connected to the read bus #1.

Refer now to the timing lines which are connected as output lines of the timing unit 22. The step counter line 132 is connected to an "and" gating circuit 200. The "and" gating circuit 200 has two input circuits connected to the output circuits ST-1 and d22.

The ½-select read #1 line is connected to an "and" gating circuit 202. The "and" gating circuit 202 has two input circuits connected to the output circuits ST-1 and d1.

The load A address line 104 is connected to an "and" gating circuit 204. The "and" gating circuit 204 has input circuits connected to the output circuits ST-2, d5-10 and $A_3'$.

The add A-syllable line 94 is connected to an "and" gating circuit 206. The "and" gating circuit 206 has three input circuits which are connected to the output circuits d5-d10, ST-2 and $A_2$.

The ½-select read #2 line is connected to an "and" gating circuit 208. The "and" gating circuit 208 has input circuits connected to the output circuits ST-2, d1 and $A_3'$.

Similar to the "and" gating circuits 204, 206, and 208, "and" gating circuits 210, 212, and 214 are provided and are connected to the load B address line 105, the add B-syllable line 95 and the ½-select read #3 line.

The "and" gating circuit 210 has its input circuits connected to the output circuits d5-d10, ST-3 and $B_3$. The input circuit of the "and" gating circuit 212 is connected to the output circuits d5-d10, ST-3, and $B_2$. The input circuits of the "and" gating circuit 214 are connected to the output circuits d1, ST-3 and $B_3'$.

"And" gating circuits 216, 218 and 220 are also provided and are connected to the load C address line 106, the add C-syllable lines 96 and the ½-select write #1 line. The inputs to the "and" gating circuits 216, 218 and 220 are similar to the "and" gating circuits 204, 206 and 208, except each have an input circuit connected to the output circuits ST-5, rather than ST-2, the gating circuit 216 is connected to the $C_3$ rather than the $A_3$ output circuit, the "and" gating circuit 218 is connected to the $C_2$ and $C_3$ output circuits rather than the $A_2$ and $A_3$ output circuits and the gating circuit 220 is connected to the $C_3'$ output circuit rather than the $A_3'$ output circuit.

The address switches line 134 is connected to an output circuit of an "or" gating circuit 222. The "or" gating circuit 222 has input circuits connected to the ½-select read lines #1, #2 and #3 and the ½-select write #1 line.

Refer now to FIG. 5-C. The timing flip-flops A3, B3 and C3 are shown therein having their reset circuits for setting to a "0" state connected to the d22 output circuit. The input circuits for setting the timing flip-flops A3, B3 and C3 to a "1" state are connected to the set lines 142, 143 and 145 respectively.

Operation

With the details of the circuits of FIGS. 2, 4, 5-A, 5-B and 5-C in mind, refer to their operation with reference to the computer flow diagram of FIG. 6.

Assume that an address has been stored in the buffer register 26 and that it, along with the present state and the next two states of the program counter 28, specify four memory locations or four addresses which are storing a command including A, B, C and O-syllables and that the syllables are stored in this order.

Also assume initially that the state counting circuit 120 and the digit counting circuit 122 are both reset into state one and that all the flip-flops, except those in the buffer register 26 and the program sequence counter 20 are reset to a "0" state by reset circuitry not shown. Thus, the computer system is in state one and digit period one. The next three clock pulses count the digit counting circuit 122 into digit periods one, two and three. During digit period one a pulse is developed on the ½-select read #1 line by gate 202, causing a ½-selection signal to be applied to the read switches 12. The signal on the ½-select read #1 line also causes a signal to be developed on the address switches line 134 by the "or" gate 222. The signal on the address switches line 122 causes the decoder 24 to apply a ½-select signal on one of the 64 address lines to the read switches 12 specified by the address stored in the buffer register 26. The coincidence of the ½-select signal on an address line from the decoder 24 and on the ½-select read #1 line causes the read bus #1 to be connected to the output of the specified delay line or memory location and during the digit periods one through twenty-one the twenty-one bits of the A-syllable are automatically shifted out of the memory 10 through the read switches 12 onto the read bus #1.

The clock pulse signals at the end of digit periods one, two and three and the gate 119, in the syllable identification circuit 18, causes the first three bits, called the identification bits, of the A-syllable to be shifted into the identification register 113 and stored.

With the three A-syllable identification bits stored in the identification register 113, the gates 130 and 124, of the syllable identification circuit 18 develop signals on the A-syllable identification line 74 during digit periods five through twenty-one. This causes the bits five through twenty-one of the A-syllable to be shifted in and stored in the A operand address register 54.

The new address flip-flops A1, B1 and C1 indicate when a new address has been stored in the command register 20. The signal on the A-syllable identification line 74 also causes the gate 172 to provide a signal causing the new address flip-flop A1 to be triggered into a "1" state indicating a new A-syllable is stored in the A address register 54.

During digit period 22 of state one, bit twenty-two of the A-syllable is shifted out of memory 10 and the signal on read bus #1 is a high potential indicating it is not the last syllable of the command. Therefore, none of the gates 154, 158 or 164 provide a signal to their respective set lines to state counting circuit 120 and the state counting circuit 120 remains in state one. However, the gate 200 provides a signal on the step counter line 132, causing the buffer register 26 to store signals in parallel corresponding to the state of the program counter 28 and the program counter 28 steps into its next state.

The digit period one is now entered and the operation of the computer system during the following digit periods one through twenty-two is similar to that during the previous digit periods one through twenty-two. The only differences are that B-syllable is shifted out, identified by the identification circuit 18, a signal is developed on the B-syllable identification line 75 by gates 130 and 125, the B-syllable is stored in the B address register 55, and the new address flip-flop B1 is triggered into a "1" state by a signal out of the gate 174.

During digit period twenty-two the program counter 28 is again stepped, then during the next following digit periods one through twenty-two, the operation is again similar except that the C-syllable is shifted out, identified by the syllable identification circuit 113, a signal is developed on the C-syllable identification line 76 by the gates 130 and 126, the C-syllable is stored in the C address register 56, and the new address flip-flop C1 is triggered into a "1" state by a signal from gate 176.

At this point the A, B and C-syllables have all been shifted out of the memory unit 10 and stored in the address registers 54, 55 and 56 of the command register 20. Program counter 28 is again counted and the digit period one is again entered followed by digit periods two through twenty-two during which the twenty-two bits of the O-syllable are shifted out of the memory unit 10 identified by the syllable identification circuit 18, a signal developed on the O-syllable identification line 77 by the gates 130 and 127 and the O-syllable is stored in the order register 57.

However, the O-syllable is the last syllable of the command shifted out of the memory unit 10. Thus, the special operation of the timing unit 22 during digit period twenty-two must be noted. During digit period twenty-two a signal is developed on the read bus #1 providing a signal to each of the gates 154, 158 and 164, to the set lines of the counting circuit 120. However, since the computer system is in state one, digit period twenty-two and the new address flip-flop A1 is in a "1" state, indicating a new A-syllable has been stored in the operand register 54, only gate 154 provides a set signal on the set line 142 and the state counting circuit 120 is triggered into state two. The set signal on the set line 142 also triggers the timing flip-flop A3 into a "1" state causing a signal at the output circuit $A_3$.

During state two the A operand is shifted out of the memory unit 10 and stored in arithmetic unit 16. Since the computer system is in state two and the timing flip-flop A3 is in a "1" state, the gate 204 will provide signals on the load A address line 104 during digit periods five through ten. The signals on the load A address line 104 cause the address bits five through ten of the A-syllable to be shifted out of the A address register 54 through the gating circuit 98 and serially shifted in and stored in the buffer register 26. The buffer register 26 receives the control signals from the output of the "or" circuit 110 for causing the address bits to be serially shifted in and stored.

With the address bits of the A-syllable stored in the buffer register 26, the computer system then steps through digit periods eleven through twenty-two. During digit period twenty-two a reset signal is applied to the input of the timing flip-flop A3 retriggering it to a "0" state. It should be noted at this point that the computer system remains in state two since the timing flip-flop A3 was in a "0" state during digit period twenty-two, there is no signal at the output circuit $A_3'$ and the gate 160 does not develop a set signal for triggering the state counting circuit 120 into state three.

During the following digit period one the timing flip-flop A3 is in a "0" state, the computer system is in state two, therefore, a ½ select signal is developed on the ½-select read #2 line. The signal on the ½-select read #2 line causes gate 222 to develop a signal on the address switches line 134 and the decoder circuit 24 provides a signal on one of the sixty-four ½-select address lines, corresponding to the A-syllable address bits stored in the buffer register 26. Simultaneously the ½ select signal on the ½-select read line #2 causes the read switches 12 to couple the output of the memory location specified by the signal on the address line to the read bus #2. During digit periods one through twenty-two the A operand is shifted out of the memory unit 10 in series to the read bus #2 and stored in the A operand register 32 in the arithmetic unit 16.

During digit period twenty-two of state two the timing flip-flop A3 is in a "0" state and the new address flip-flop B1 is in a "1" state, indicating a new B-syllable has been stored in the B address register 55. This causes a set signal on the set line 143 causing the state counting circuit 120 to count into state three. Also, the set signal on the set line 143 provides a signal to the timing flip-flop B3 setting it into a "1" state.

During state three the B operand is shifted out of the memory unit 10 and stored in the B operand register 34 of the arithmetic unit 16. The operation of the computer system during state three is similar to that during state two. The only differences are that during the first cycle through digit periods one through twenty-two a signal is developed at the output circuit $B_3$ of the timing flip-flop B3 causing signals on the load B address line 105 by the gate 210 and the address bits of the B-syllable stored in the B operand register 55 are shifted out through the gating circuit 98 and stored in the buffer register 26. During digit period twenty-two of state three the timing flip-flop B3 is retriggered to a "0" state.

During the second cycle through digit periods one through twenty-two of state three a ½ select signal is developed on the ½-select read #3 line by the gate 214 and the decoder circuit 24 provides a signal on one of the ½-select address lines corresponding to the B-syllable address stored in the buffer register 26 causing the B operand to be shifted out of the memory unit 10 on the read bus #3 and stored in the B register 34 of the arithmetic unit 16. During the second digit period 22 of state two the timing flip-flop B3 is in a "0" state and the gate 168 provides a signal to the set line 144 causing the state counting circuit 120 to step into state four.

During state four of the computer system the operation specified by O-syllable stored in the O register 57 is executed by the arithmetic unit 16. During state four a signal is developed on the ST-4 output of the state counting circuit 120 and the execute line 48, causing the arithmetic control circuit 46 of the arithmetic unit 16 to provide timing and execute the order on the operands in the registers 32 and 34 specified by the order in the O register 57. When the order has been executed and the results stored in the C register 36 of the arithmetic unit 16 a ready signal is developed on the ready line 52 by the arithmetic and control circuit 46 during the following twenty-two digit periods.

Since the computer system is in state four, the new address flip-flop C1 is in a "1" state indicating a new C-syllable is stored in the C address register 56, the subsequent digit period twenty-two causes the gate 170 to develop a set signal on the set line 145 and the computer system steps into state five. Also, the set signal on the set line 145 triggers the timing flip-flop C3 into a "1" state.

During state five the result of the arithmetic operation now stored in the C register 36 of the arithmetic unit 16 is serially shifted out of arithmetic unit 16, through the write switches 14 and stored in the memory unit 10. During the first cycle through digit periods one through twenty-two of state five signals are developed on the load C address line 106 by the gate 216 during digit periods five through ten. Similar to the A-syllable, the address bits of the C-syllable are shifted out through the gating circuit 98 and stored in the buffer register 26. Similar to that during state two, during the second cycle through digit periods one through twenty-two of state five the timing flip-flop C3 is in a "0" state and the gate 220 provides a ½ select signal on the ½-select write #1 line. This causes the write switches 14 to connect the write bus #1 to the memory locations specified by the address signals stored in the buffer register 26, and the result signals stored in the C register 36 are serially shifted out on the write bus #1 and stored in the addressed memory location of the memory unit 10.

During the second digit period twenty-two of state five the timing flip-flop C3 is in a "0" state, a signal is developed at the $C_3'$ output circuit and gate 150 provides a set signal on the set line 141 causing the computer system to step back into state one. With the computer system back in state one the operatioin outlined above is repeated. A new command is shifted out of the memory unit 10 and executed and the results stored in the memory unit 10.

The operation outlined above assumed that there were A, B C and O-syllables in the command, and that the O-syllable specified that the address syllables were not to be incremented. The operation of the computer system will now be considered when an I-syllable is included in the command and the O-syllable specifies that the A-cyllable is to be incremented.

Assume that the A, B and C-syllables have been shifted out of the memory unit 10 and stored in the command register 20 in the manner outlined above during state one. Also assume that the computer system is still in state one and that an O-syllable is now to be shifted out which specifies that the A-syllable is to be incremented. Also assume that the O-syllable is not the last syllable of the command but that an increment syllable stored in the next memory location after the O-syllable is in the last syllable of the command.

Assume now that the O-syllable is being shifted out of the memory unit 10. During digit periods one through seventeen, bits one through seventeen of the O-syllable are shifted out of the memory unit 10 in series on the read bus #1. The identification bits of the O-syllable are shifted into the identification register 113 of the identification circuit 18 and an O identification signal is developed on the O identification line 77. During digit period eighteen a signal in the O-syllable is applied to the read bus #1 indicating that the A-syllable is to be incremented. This causes gate 190 to provide a signal to the gate 178 which in turn develops a set signal to the increment flip-flop A2 triggering it into a "1" state. When the increment flip-flop A2 is set into a "1" state it develops a signal at its $A_2$ output circuit. The signal at the $A_2$ output circuit causes the gate 172 to provide a set signal to the new address flip-flop A1. However, the new address flip-flop A1 is already in a one state, having been triggered into a one state by the signal on the A-syllable identification line 74, therefore, the state thereof is unaffected.

The buffer register 26 reads the states of the program sequence counter 28 and stores a corresponding address signal. The program sequence counter is then stepped into its next state of operation. The address signals stored by the buffer register 26 specifies the address of the I-syllable. During the next digit periods one through twenty-two the memory location of the memory unit 10 storing the I-syllable is addressed by the decoder 24, corresponding to the I-syllable address stored in the buffer register 26 an dthe I-syllable is shifted out in series through the read switches 12 to the read bus #1. The identification bits of the I-syllable are stored in the identification register 113. During digit periods five through twenty-one the gates 130 and 128 provide a signal on the I identification line 78. Since the I-syllable is the last syllable of the command, bit 22 thereof provides a signal on the read bus #1, a set signal is developed on the set line 142, state two is entered and the timing flip-flop A3 is triggered into a "1" state.

During the first cycle through digit periods one through twenty-two of state two the timing flip-flop A3 is in a "1" state causing signals on the load A address line 104. However, in addition, the increment flip-flop A2 is in a one state causing a signal at its $A_2$ output circuit thereby indicating that the A-syllable is to be incremented. Both the address bits of the A-syllable and the increment bits of the I-syllable are bits five through ten. During digit periods five through ten signals are developed on both the load A address line 104 and the add A-syllable line 94 by the gates 204 and 206, respectively. This causes the increment bits of the I-syllable to be added to the address bits of the A-syllable by the adder circuit 84 and the resultant signals serially shifted out and stored in the buffer register 26. Also, the incremented signals are restored in register 54. During digit period twenty-two the timing flip-flop A3 is retriggered to a "0" state.

During the second cycle through digit periods one through twenty-two of state two a signal is developed on the ½-select read #2 line by the gate 208. The following operation wherein the A and B operands are shifted out of the memory unit 10, the order executed and the result stored in the memory unit 10 is identical to that already described for states two, three, four and five except that an incremented address stored in the buffer register 26 is used for addressing the memory unit 10 rather than the A-syllable address signals shifted out from the memory unit 10.

The increment flip-flop A2 can only be reset to a "0" state by a new O-syllable shifted out of the memory unit 10 having a bit eighteen which specifies that the A-syllable is not to be incremented. Thus, if the next command has an O-syllable that does not specify the A-syllable is to be incremented the inverter circuit 194 and gate 192 will provide a signal during digit period eighteen and the increment flip-flop A2 will be reset to a "0" state. If however, for example, the next command shifted out of the memory 10 does not contain an "0" syllable and the increment flip-flop A2 is previously in a "1" state the incremented address of the A-syllable, stored in the A address register 54 during the previous state two while incrementation took place, will be incremented. The O-syllable stored in the O register 57 during the previous command will then be re-executed but using the re-incremented A-syllable address for the address of the new A operand. Thus, an order may be shifted out of the memory 10 which specifies that the A-syllable is to be incremented. New commands may then subsequently be shifted out of the memory 10 and stored in the command register 20 which do not contain an O-syllable but, for example, may contain a new I-syllable, a new B-syllable, and a new C-syllable, and the old A-syllable may be reused in its incremented form but re-incremented for each command by an amount as specified by the I-syllable then stored in I register 58.

Also, a new O-syllable may be shifted out in a command which does not contain a new A-syllable but specifies that the A-syllable, previously stored in register 54, either in an incremented or unincremented form is to be incremented for use as the A operand address. Thus, if it is desirable to use a reference A operand address and merely increment it to derive the addresses of other operands the A-syllable does not need to be stored in each command but the old A-syllable can be incremented. Also, the A-syllable may be incremented by different amounts during the execution of successive commands by providing a new I-syllable in each command.

The operation of the computer system during which B-syllables and C-syllables are incremented is similar to that during which A-syllables are incremented except that the incrementation takes place during states three and five rather than state two. Also, signals are developed on the add B and C-syllable lines 95 and 96 by the gates 212 and 218 and increment flip-flops B2 and C2 are used for control of gates 212 and 218 rather than the increment flip-flop A2.

Consider now the operation of the computer system assuming that none of the syllables are to be incremented and that the flip-flops A2, B2, C2, A3, B3 and C3 are all in "0" states. Assume that the subsequent command to be shifted out of the member unit 10 only contains B, C and O-syllables, the A and I-syllables being absent from the command. During the subsequent discussion it should be kept in mind that whenever an operand is shifted into the arithmetic unit 16 and stored in the operand register 32 or 34, that operand is stored there permanently until a new operand is shifted in and stored to replace the old operand. Assume now that a signal is developed on the set line 141 causing each of the new address flip-flops A1, B1 and C1 to be reset into a "0" state and the command register 20 to enter state one. During state one while the B and C-syllables are read out of memory 10 the flip-flops B1 and C1 are triggered into a "1" state. However, since an A-syllable is absent the new address flip-flop A1 is still in a "0" state. Thus, during digit period twenty-two of state one when the last syllable signal is developed on the read bus #1 the new address flip-flop A1 is in a "0" state and flip-flop B1 is in a "1" state, and the state counting circuit 120 is triggered directly from state one into state three by a signal from gate 158 rather than into state two by a signal from gate 154. The set signal on the set line 143 by the gate 158 also triggers the timing flip-flop B3 into a "1" state similar to that discussed above.

During state three the B-syllable address bits are shifted out of the B register 55 and stored in the buffer register 26. Subsequently, the read switches 12 receive a signal on the ½-select read line #2 and a signal on one of the ½-select address lines causing the B operand stored in the addressed memory location to be shifted out and stored in the B register 34 of the arithmetic unit 16.

State four is subsequently entered and order stored in the O register is executed as already discussed. However, since a new A operand was not read out and stored in the A register 32 of arithmetic unit 16 of the old A operand stored in the A operand register 32 during the previous command is used as the A operand.

Thus, it may be seen that if the same operand used during the previous command is to be used during the next subsequent command the new command need not contain a new A-syllable to specify the address of the A operand.

Referring now to the computer flow diagram of FIG. 6, assume that new A, C and O-syllables of a command have been stored in the command register 20 but that B-syllable is absent from the command. The computer system will step from state one into state two, skip state three and then step into states four and five. During state four the order executed by the arithmetic unit 16 will be performed on the old B operand stored in the B register 34 of the arithmetic unit 16 during the previous command.

It should also be understood that both the A and the B-syllables may be absent from a command in which an O and C-syllable is provided. In this situation the old A and B operands stored in arithmetic unit 16 during the steps of a previous command will be used in executing the order and the computer system will step from state one into state four then into state five.

Consider the operation of the computer system when a command is shifted out of the memory 10 in which there are A, B and O-syllables, the C and I-syllables being absent from the command. During state four the new address flip-flop C1 will be in a "0" state, since a new C-syllable was not identified by the syllable identification circuit 18. Thus, at the end of state four when the arithmetic and control circuit 46 of the arithmetic unit 16 provides a signal on the ready line 52, the gate 152 rather than the gate 170 develops a set signal and the state counting circuit 120 skips from state four back to state one. Thus, it should now be evident that the operation is slightly different when a C-syllable is absent from a command, and the computer system executes the order during state four but skips back to state one and as a result does not store the result of this arithmetic operation.

Also, consider the operation of the computer system when a command is shifted out of the memory 10 which contains A, B and O-syllables, the C-syllable and I-syllable being absent from the command. However, assume that the O-syllable specifies that the C-syllable is to be incremented. During digit period twenty of state one during the time the O-syllable is shifted out of the memory 10 a signal is applied on the read but #1 causing the gate 190 to provide a signal to the gate 182. The gate 182 provides a set signal to the increment flip-flop C2 triggering it into a "1" state. The C₂ output of the increment flip-flop C2 provides a signal to the gate 176 causing the new address flip-flop C1 to be set into a one state. The computer system then steps from state one through states two, three and four, and executes the order specified by that stored in the O register 57. When a signal is developed on the ready line 52 the new address flip-flop C1 is in a "1" state and the gate 170 provides a signal on the set line 145 during digit twenty-two and the state counting circuit 120 steps into state five. As a result, the computer system stores the result of the arithmetic operation in the memory 10. The address where the result is to be stored is determined by the old C-syllable address signal stored in the C register 56 but which was incremented by the amount specified by the I-syllable stored in the I register 58. Thus, it is seen that whenever a C-syllable is absent from a command, the command will be executed but the result will not be stored. However, if the order syllable specifies that the C-syllable is to be incremented, the old C-syllable stored in the C register 56 will be incremented and the result stored in the derived address of memory 10.

It should be understood that a computer system according to the present invention is not restricted to a system wherein each of the syllables contain a last bit to indicate that it is the last syllable of a command. Instead, one of the syllables could be selected which will always be the last syllable of a command. For example, whenever a command is shifted out of the memory 10 the last syllable could always be an O-syllable and the presence of the O-syllable would be used to indicate that it is the last syllable of a command.

Also, it should be understood that the computer system according to the present invention may not have an arithmetic unit that permanently stores the operands. Instead, the old address syllables stored in the command register 20 during a previous command may be used to address the memory 10 and the old operand re-read from memory 10. It should be appreciated that in the latter arrangement the programmer does not need to provide the syllable addresses in a command if identical to that in a previous one.

There are other re-arrangements of the present invention that are within the scope of the following claims.

What is claimed is:

1. A stored program computer system comprising, addressable memory means for storing operands and variable length commands, the commands being arranged in a sequence and at least part of the commands having only those parts which are different from the corresponding part of a preceding command and including a signal identifying the part of the command which is present, means for reading commands out of the memory means, identification means connected to be responsive to the identification signals in a command read out of the memory means for providing an indication of the part which is present in such command, means connected to be responsive to said indication and the corresponding command for storing a signal corresponding to the part of the command which is present, means connected to be responsive to the signals stored in the last mentioned means for selectively addressing storage locations in said memory means containing operands which are to be read, means for reading the operands out of the addressed storage locations of the memory means, and an arithmetic unit connected to be responsive to the content of the signal storing means and the operands read out of said memory means for selectively executing a command.

2. A variable command length computer system comprising, addressable memory means for storing operand signals and variable length commands, each command comprising at least one syllable having a group of signals, the syllables of said commands comprising operand address syllables and order syllables, said commands being arranged in a prearranged order defining a program and including at least one command having only those syllables which are different from the corresponding syllables in the previous command in said prearranged order, each syllable including at least one signal for identification thereof and a signal for specifying the last syllable of a command, means for reading commands out of the memory means, identification means connected to be responsive to each identification signal of the syllables present in each command read out of said memory means for providing a corresponding output signal, storage means connected to be responsive to the output signal of the identification means for separately storing the corresponding syllable, means connected to be responsive to the address syllables stored in the storage means for reading the operands out of the memory locations of the memory means specified thereby, an arithmetic unit coupled to be responsive to the order syllable stored in the storage means and operand signals read out of said memory means for executing such order on such operands in response to a control signal, and timing means coupled to be responsive to the presence of a last syllable signal in a syllable read out of the memory means for applying a control signal to the arithmetic unit for initiating the operation thereof.

3. A computer system comprising, addressable memory means having syllable and operand signals stored therein, said syllable signals being arranged in groups of variable numbers defining commands, each syllable including at least one signal for identification thereof, means for reading commands out of the memory means, identification means connected to be responsive to the identification signals of each syllable read out of said memory means for identifying same and for providing a corresponding output signal, storage means including a separate storage location for each syllable of a command and arranged to be responsive to the output signal of said identification means for storing a syllable in the corresponding storage location, means for reading the operand signal out of the memory means specified by an operand address stored in the storage means, an arithmetic unit coupled to be responsive to an order syllable stored in said storage means for selectively executing the specified operation on the operand signals read out of said memory means and for forming a result signal, and means connected for storing the result signal formed by the arithmetic unit in said memory means.

4. A computer system comprising, addressable memory means including syllable and operand signals stored therein and connected to be responsive to applied address signals for reading out the stored operand signals, said syllable signals being arranged in groups of variable numbers for defining commands and including at least an operand address syllable and an order syllable and each comprising at least one signal for identification of the syllable in the command group and to specify the end of a command, means for reading the command syllables out of said memory means, identification means connected to be responsive to the identification signal in a syllable read out of said memory means for providing a corresponding output signal, storage means including at least one register for storing an operand address syllable and at least one register for storing an order syllable and connected to be responsive to the output signal of said identification means for selectively storing the identified syllable in the corresponding register, circuit means connected to be responsive to the last syllable signal in each command read out of said memory means for providing a corresponding output signal, an arithmetic unit arranged for executing operations on the operand signals read out of said memory means as specified by the order syllable stored in the storage means in response to the output signal of said circuit means, and means for addressing the memory locations of said memory means specified by the operand addresses stored in the storage means for causing the operands to be read and subsequently executed by the arithmetic unit.

5. A computer system comprising, addressable memory means including operand and syllable signals, said syllables including operand address syllables and order syllables, arranged in variable numbers defining commands and each syllable having at least one signal for identification thereof, means for reading the syllables out of the memory means, identification circuit means connected to be responsive to the identification signal of the syllables read out of said memory means for providing a corresponding output signal, storage means including at least one register for an address syllable and at least one register for an order syllable and connected to be responsive to the output signal of said identification circuit means for selectively storing the identified syllables in the corresponding registers, addressing means including a buffer storage means and means for storing signals corresponding to the operand addresses contained in the storage means into the buffer means and arranged for addressing storage locations of the memory means designated by address signals stored in the buffer storing means, means for reading the operands out of the addressed storage locations of the memory means, and an arithmetic unit coupled for receiving and executing an operation on operand signals read out of said memory means as specified by order syllables stored in the storage means.

6. A computer system comprising, addressable memory means having syllable and operand signals stored therein and connected to be responsive to applied address signals for storing and selectively reading out signals stored therein, said syllable signals including operand address syllables and order syllables and arranged in variable numbers defining commands and each comprising at least one signal for identification thereof, identification means connected to be responsive to the identification signal of each of the syllable signals read out of said memory means for providing a corresponding output signal, command storing means having storage locations therein and connected to be responsive to the output signal of said identification means for individually storing the identified syllable signals in a location corresponding to the particular type of syllable, an arithmetic unit coupled for receiving and executing an operation on the operand signals read out of said memory means as specified by an order syllable stored in the storing means, and addressing means including a buffer register and gating circuits coupled for storing the operand address syllables into the buffer register contained in the storage means, the addressing means including a decoding circuit connected to be responsive to an operand address syllable stored in said buffer register for providing a corresponding address signal to said memory means for causing an operand to be read out thereof for execution of an order syllable by the arithmetic unit.

7. A programmable computer system comprising, memory means including stored syllable and operand signals, said syllables including address and order syllables arranged and stored in sequence in groups of variable length to define commands, each of said syllables comprising at least one identification signal, reading circuit means connected to be responsive to applied address signals for reading out the syllable and operand signals stored in said memory means, identification circuit means coupled to be responsive to the identification signal of syllable signals read out of said memory means for providing a corresponding output signal, command storing means having a plurality of storage locations and coupled to be responsive to the output signal of said identification circuit means for storing the syllables read out of said memory means in a storage location corresponding to the particular type of syllable, an arithmetic unit connected for receiving the operand signals read out of said memory means and for executing an operation thereon as specified by the order syllable stored in the command storing means and arranged for providing a corresponding result signal, writing circuit means connected to be responsive to applied address signals for writing said result signal in said memory means, and addressing circuit means including a buffer register and arranged for storing address signals corresponding to the address syllables contained in the command storing means into the buffer register and including means for applying address signals corresponding to the address signals stored in the buffer register to said read and write circuit means for causing operands to be read out of said memory means and for causing result signals to be written in the memory means and arranged for applying a series of command address signals to said reading circuit means for causing the syllables of the commands to be read out of said memory means.

8. A programmable computer system the combination of which comprises a memory unit for storing syllable and operand signals, said syllables including at least operand address syllables, order syllables and result address syllables and arranged and stored in the memory unit in sequence in groups of variable length defining commands, each of said syllables comprising at least one identification signal, reading circuit means connected to be responsive to applied address signals for selectively reading out the syllable and operand signals from said memory unit, syllable identification circuit means coupled to be responsive to the identification signals of the syllable signals read out of said memory unit for forming a signal corresponding to the type of syllable detected, a command register unit including separate registers for the order, operand address and result address syllables of a command and coupled to be responsive to the signal formed by said identification circuit means for selectively storing the syllable signals read out of said memory unit into the corresponding registers, an arithmetic unit arranged for receiving the operands read out of said memory unit and for executing the orders thereon specified by order syllables contained in the command register unit and for forming a corresponding result signal, writing circuit means coupled to be responsive to applied address signals for writing the result signals formed by said arithmetic unit into said memory unit, and addressing circuit means coupled for applying operand address signals corresponding to those stored in the command register unit and arranged for applying syllable addresses to the reading circuit means for causing the syllables and operands to be read out of the memory unit, said addressing circuit means additionally being arranged for applying result address signals corresponding to those contained in the command register unit to the writing circuit means for causing the result signals formed by the arithmetic unit to be written in the memory unit.

9. A computer system the combination of which comprises a memory unit including operand and command signals stored therein, said command signals being arranged in series in variable numbers of signal groups comprising at least one signal for identification of each group present in a command and a signal for specifying the end of a command, said signal groups including order, operand address and result address signal groups, a read circuit connected to be responsive to applied address signals for serially reading operand and command signals out of said memory unit, an identification circuit connected to be responsive to the identification signals of each command read out of said memory unit for providing an identification signal corresponding to the groups therein, means connected to be responsive to said end of command signal in a command group read out of said memory unit for providing a predetermined signal when the last group of a command is read out of said memory unit, a command register unit including a separate register for each type of signal group in the commands and arranged to be responsive to said indication signal for selectively storing the groups of a command read out of said memory in the corresponding register, an arithmetic unit coupled for receiving the operands read out of said memory unit and arranged for selectively executing an operation on the operands defined by orders contained in the command register unit and for forming a corresponding result signal when a signal is provided by the end of command signal means, a write circuit connected to be responsive to applied address signals for selectively writing said result signals in said memory unit, and memory addressing means coupled for applying address signals to said read and write circuits corresponding to the operand and result addresses contained in the command register unit including means for applying command addresses to the read circuit for causing commands to be read out of said memory unit.

10. In a digital computer the combination comprising, memory means for storing a program composed of commands, the commands being composed of parts defining a complete command, at least one command having an absent part therefrom, which is the same as the corresponding part of a previous command containing such part, means for reading the commands out of said memory means for execution, means for detecting the absence of a part of a command read out of the memory means, and means for receiving and executing a complete command read out of the memory means and including means connected to be responsive to the detection of an absent part from a command for normally executing the other parts of such command in accordance with a part, corresponding to the absent part, contained in a previous command.

11. In a digital computer the combination comprising, memory means for storing a program composed of commands, the commands being composed of signals defining specific parts of a complete command, at least one command having an absent part which part is the same as the corresponding part in a preceding command in the program containing such part, means for reading a plurality of said commands out of said memory means, command storing means, means coupled for storing said plurality of commands into the command storing means and arranged upon receipt of a command having an absent part for replacing a command signal part stored in the command storing means with the corresponding part contained in the command, said command storing means including means arranged for retaining a previously stored command signal part corresponding to a part absent from a command being stored for execution, and means for executing a stored command having an absent part under control of the command parts contained in the command storing means.

12. In a digital computer the combination comprising, memory means for storing a program composed of variable length commands, the commands being composed of syllables defining specific parts of a complete command and arranged with at least one syllable absent from a command which syllable the same as the corresponding syllable in the preceding command containing such syllable, means for reading the commands out of said memory means, command storing means, means coupled for storing the syllables of the variable length commands read out of the memory means into the command storing means and arranged for replacing a previously stored syllable in the command storing means with the corresponding syllable contained in a command read out of the memory means, said command storing means including means arranged for retaining a previously stored syllable therein for execution in the absence of a corresponding syllable in a command, and arithmetic means arranged for executing a command composed of the syllables including a retained syllable contained in the command storing means subsequent to a new command read out of the memory means.

13. In a digital computer the combination comprising, memory means for storing operands and a program of variable length commands designating operands and operations thereon, the commands having parts defining a complete command and including commands having at least one part absent therefrom, means for reading commands out of the memory means, means for storing a signal corresponding to the parts of the commands read out of the memory means, means for detecting parts absent from a command read out of the memory means, means for replacing a signal previously stored in the storing means with a signal corresponding to the part contained in a command read out of the memory means, said storing means including means arranged in response to the detection of an absent part for retaining the corresponding part of a previously stored command, means for reading the operands out of the memory locations of the memory means designated by the stored signals, and an arithmetic unit connected for executing operations defined by the command signal parts contained in the command storing means including any part retained from a previous command on the operands read out of the memory means.

14. A digital computer as defined in claim 13 wherein said arithmetic unit comprises at least one means including a register arranged for permanently, from one command to the next, storing an operand read out of the memory means until a new operand is read out of the memory means to replace the operand, said detection means including means for detecting the absence of an individual command part, from a command, which part designates an operand for storage in said register, and means responsive to the absence of the individual command part detection thereby indicating the individual command part is present in a command for reading out the operand designated by such command part and for storing same in said register for execution by the arithmetic means.

15. In a digital computer the combination comprising, memory means for storing operands and a program of variable length commands, each command having at least one syllable of a complete set of syllables defining a complete command, the syllables comprising at least operand address syllables and operator syllables, at least one of the types of syllables being absent from certain ones of said commands, means for reading commands out of the memory means, means connected to be responsive to the commands read out of the memory means for storing a signal corresponding to operator and operand address syllables contained therein, the storing means including means arranged for retaining an operator signal, from one command to the next, in the absence of an operator syllable in a command, means for reading operands out of and for writing result signals in the addresses of the memory means specified by the address signals contained in the storing means, and an arithmetic unit connected for executing operations defined by the operation control signals on the operand signals read out of the memory means and for forming corresponding result signals for storage.

16. In a digital computer the combination comprising, memory means for storing operands and a program of variable length commands, each command having at least one syllable of a complete set of syllables defining a complete command, the syllables comprising at least operand address syllables and operator syllables including an identification signal for each syllable, certain ones of said commands having at least one of the types of syllables making up a complete command absent therefrom, means for reading commands out of the memory means, means responsive to the identification signals for detecting the syllables present in the commands read out of the memory means and for providing a corresponding output signal, command storing means including a separate storage location for each type of syllable in a complete command and connected to be responsive to the output signal of the detecting means for storing a signal corresponding to each syllable read out of the memory means into the corresponding storage location of the command storing means, the command storing means being adapted for retaining at least one of the syllables previously stored therein in the absence of the detection of the corresponding syllable in a command, means for reading the operands out of the memory means specified by the content of the command storing means and means for processing the operand signals read out of the memory means as defined by a stored operator syllable.

17. In a digital computer the combination comprising, memory means for storing a program composed of a series of commands some of which contain an operator and some of which do not, means for reading said series of commands out of the memory means, means for receiving and executing the series of commands read out of the memory means and including means for normally executing each of said commands in accordance with an operator contained in a previously executed command in response to each command received which does not contain an operator until a command is received for execution with an operator.

18. In a digital computer the combination comprising, memory means for storing a program composed of commands, the commands being composed of parts defining a complete command, a series of said commands having at least one part of a complete command absent therefrom which part is the same as the corresponding part of a previous command in the program, means for reading the commands out of the said memory means for execution, and means for receiving and executing commands read out of the memory means and including means arranged for normally executing said series of commands in accordance with the parts therein and the corresponding part in the previous command in the program containing the absent part until a command is read out of the memory means containing the absent part.

19. In a digital computer the combination comprising, memory means for storing a program composed of a series of commands some of which contain an operator and some of which do not, means for reading said series of commands out of the memory means, means for receiving and executing the series of commands read out of the memory means and including means for retaining an indication of the operation defined by an operator contained in a previous command during the execution of a command without an operator and arranged for normally executing commands without an operator in accordance with the stored indication until a command is received for execution with an operator.

References Cited by the Examiner

UNITED STATES PATENTS 2,914,248  11/1959  Ross et al. _____ 235—157

OTHER REFERENCES

IBM Reference Manual 1401 Data Processing System, International Business Machines Corporation, 1960, page 17.

ROBERT C. BAILEY, *Primary Examiner.*

WALTER W. BURNS JR., *Examiner.*

B. REIN, R. M. RICKERT, *Assistant Examiners.*

UNITED STATES PATENT OFFICE
CERTIFICATE OF CORRECTION

Patent No. 3,275,989                                September 27, 1966

Edward L. Glaser et al.

It is hereby certified that error appears in the above numbered patent requiring correction and that the said Letters Patent should read as corrected below.

Column 2, line 54, for "memeroy" read -- memory --; column 3, line 73, for "syllables" read -- syllable --; column 5, line 30, before "Storage" insert -- entitled --; column 6, line 7, for "ence" read -- enced --; column 8, line 56, for "decorder" read -- decoder --; column 22, line 48, after "syllable" insert -- is --.

Signed and sealed this 22nd day of August 1967.

(SEAL)
Attest:

ERNEST W. SWIDER                                EDWARD J. BRENNER
Attesting Officer                                      Commissioner of Patents